(12) United States Patent
Langelaar

(10) Patent No.: US 7,779,271 B2
(45) Date of Patent: Aug. 17, 2010

(54) WATERMARK EMBEDDING

(75) Inventor: Gerrit Cornelis Langelaar, Eindhoven (NL)

(73) Assignee: Civolution B.V., Eindhoven (NL)

( * ) Notice: Subject to any disclaimer, the term of this patent is extended or adjusted under 35 U.S.C. 154(b) by 1228 days.

(21) Appl. No.: 10/495,952

(22) PCT Filed: Oct. 24, 2002

(86) PCT No.: PCT/IB02/04485

§ 371 (c)(1),
(2), (4) Date: May 18, 2004

(87) PCT Pub. No.: WO03/044735

PCT Pub. Date: May 30, 2003

(65) Prior Publication Data

US 2005/0220321 A1   Oct. 6, 2005

(30) Foreign Application Priority Data

Nov. 23, 2001   (EP) .................................. 01204502

(51) Int. Cl.
*H04L 9/32* (2006.01)
(52) U.S. Cl. ........................................ 713/189; 726/26
(58) Field of Classification Search .................. None
See application file for complete search history.

(56) References Cited

U.S. PATENT DOCUMENTS 5,636,292 A * 6/1997 Rhoads ........................ 382/232
5,901,178 A * 5/1999 Lee et al. ..................... 375/240
6,373,960 B1 * 4/2002 Conover et al. ............. 382/100
6,633,654 B2 * 10/2003 Hannigan et al. ........... 382/100

FOREIGN PATENT DOCUMENTS

GB         2063018       5/1981
WO       WO9945705      9/1999

OTHER PUBLICATIONS

"Digital Watermarking of MPEG-2 Coded Video in the Bitstream Domain" Frank Hartung, Bernd Girod, 1997 IEEE, pp. 2621-2624.
"Perceptual Watermarking of Still Images" C. Podilchuk; W. Zeng, 1997 IEEE, pp. 363-368.
"DCT quantization Matrices visually optimized for individual images" Andrew B. Watson, SPIE vol. 1913- pp. 202-216.

* cited by examiner

*Primary Examiner*—Kambiz Zand
*Assistant Examiner*—Dant B Shaifer Harriman
(74) *Attorney, Agent, or Firm*—Barnes & Thornburg LLP

(57) ABSTRACT

Advanced watermark embedders use psycho visual/acoustic models to minimize perception of the embedded watermark in media contents. However, it is expensive to implement such advanced watermark embedders in consumer appliances (3) such as DVD recorders. In accordance with the invention, embedding strength parameters (JND) are calculated (13) off-line at a remote location (1) and transmitted along with the media contents to the consumer appliance (3). A relatively simple embedder (33) uses the received parameters to control the strength of the watermark (36) to be embedded. The parameters may be accommodated in the transmitted signal as payload of a fragile watermark or as user data in an encrypted MPEG stream.

9 Claims, 2 Drawing Sheets

WATERMARK EMBEDDING

The invention relates to a method and an arrangement for embedding a watermark in a media signal. The invention also relates to a method and an arrangement for transmitting a media signal to be watermarked from a remote location to a local station.

Known advanced watermark embedders usually exploit human psycho acoustic or visual models in order to embed a robust yet imperceptible watermark in a media signal (e.g. images, video, audio). In such watermark embedders, the strength of the embedded watermark is adaptively controlled in dependence on characteristics of the contents such as spatial details of an image, the actual frequency spectrum of an audio signal, etc. Determining such characteristics is a complex operation. This is not a problem for content providers, recording studios, broadcasters, etc. They can use expensive professional equipment for watermark embedding.

Some applications, however, require a watermark to be embedded in consumer appliances. An example thereof is a consumer audio or video recorder which has to embed a watermark in the signal to be recorded so as to indicate that the recorded media signal may not be copied anymore.

It is an object of the invention to provide a more economic method of embedding a watermark in a media signal. It is also an object of the invention to adaptively control the watermark embedding strength in dependence upon characteristics of the contents without requiring the appliance to analyze the contents and determine said characteristics.

To this end, the invention provides a method of embedding a watermark in a media signal, comprising the step of adaptively controlling the embedding strength in dependence on an embedding parameter, characterized in that the method comprises the step of receiving said embedding parameter in the form of an auxiliary signal received along with the media signal.

It is achieved with the invention that the embedding strength is pre-calculated at a remote location and subsequently conveyed to the embedder along with the media signal. The embedder itself does not need to compute characteristics of the signal contents.

In accordance with a further aspect of the invention, a method of transmitting a media signal from a remote location to a local station is characterized in that the method includes the steps of computing at the remote location a watermark embedding parameter, said embedding parameter representing the strength with which a watermark is to be embedded in the media signal by the local station; and transmitting said embedding parameter to the local station in the form of an auxiliary signal along with the media signal.

The invention is particularly advantageous in applications where the received media signal has already been watermarked. An example thereof is a consumer audio or video recorder which receives a media signal having an embedded watermark (the "primary" watermark) indicating that the signal may be copied only once, and which has to embed a further watermark (the "secondary" watermark) in the media signal to indicate that the recorded media signal may not be copied anymore. In such an application, a professional embedder has already been used at the remote location to embed the primary watermark using the concept of adaptively controlling the embedding strength. The same control parameter or parameters are used by the consumer recorder.

The invention will be explained in further detail, and by way of example, with reference to the accompanying drawings wherein.

Figure 1:
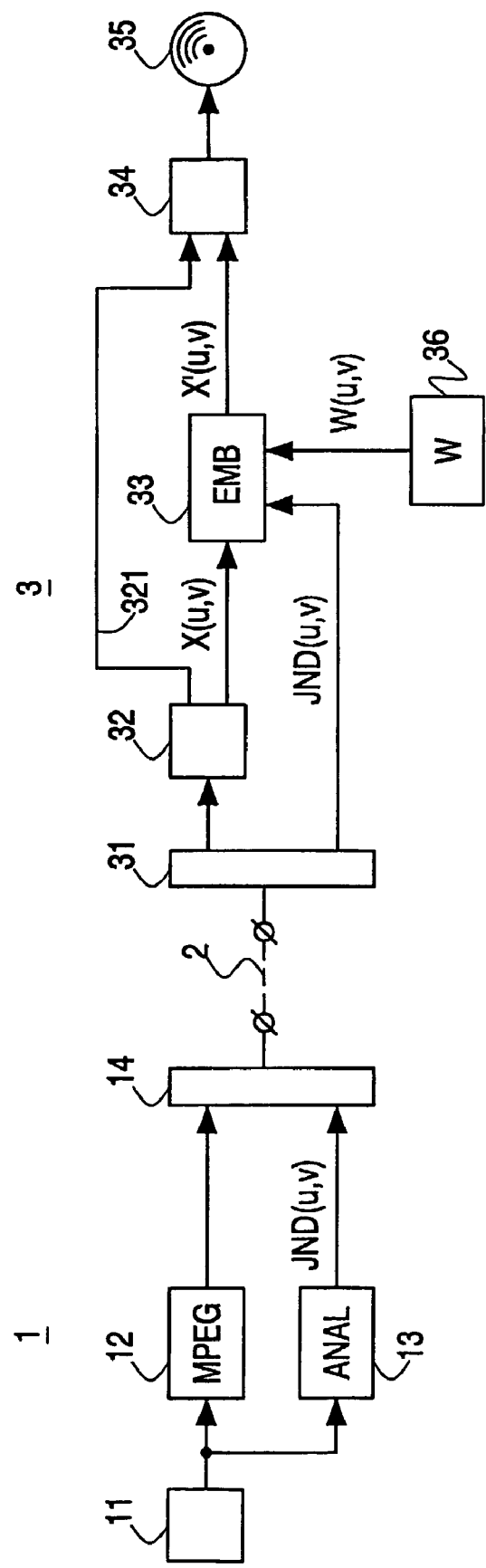
FIG. 1 shows schematically a system comprising a video transmitting station, a transmission or storage medium, and a consumer appliance in accordance with the invention.

The invention will hereinafter be described with reference to embedding a watermark in motion video material, but it will be appreciated that the invention is equally applicable to still images, audio contents, speech, and other data signals. FIG. 1 shows a schematic diagram of a system comprising a video transmitting station 1 at a remote location, a transmission or storage medium 2, and a consumer appliance 3.

The transmitting station 1 includes a video source 11 and an MPEG encoder 12. It will be assumed that the video source material applied by the video source 11 has already an embedded (primary) watermark to indicate that the program may be copied only once. The watermark may have been embedded, for example, in the spatial domain in a manner disclosed in International Patent Application WO 99/45705. Neither the presence of the primary watermark in the source material, nor the manner in which it has been embedded, however, is essential to this invention. The example is merely given to describe a practical application of the invention. The "copy once" primary watermark indicates that a user is allowed to record the program once for later viewing. The user is not allowed to make copies of the recorded program.

The watermarked video source material is MPEG encoded by an MPEG encoder 12 and transmitted via the transmission medium 2 to the consumer appliance 3. The consumer appliance 3 is here assumed to be a compliant DVD recorder. The expression "compliant" means that the recorder complies with certain copy management rules. More particularly, the DVD recorder includes a watermark detector (not shown) which checks whether the "copy once" primary watermark is found in the received contents. If that is the case, the DVD recorder has to embed a "copy no more" watermark (the secondary watermark) in the recorded material to indicate that the recorded material may not be copied anymore. This process of embedding a further watermark in already watermarked contents is also referred to as "re-marking".

Figure 2A:
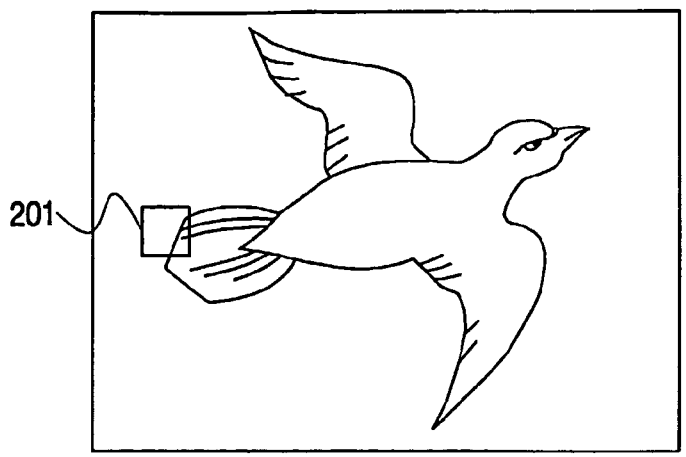
FIGS. 2A-2C show diagrams to illustrate the operation of the system which is shown in FIG. 1.

FIG. 2A shows one of the video images received by the DVD recorder by way of illustrative example. In the MPEG encoder 12, it has been divided into blocks of 8×8 pixels, one of which is denoted 201 in FIG. 2A. The pixel blocks have been discrete cosine transformed (DCT) into respective blocks of 8×8 DCT coefficients. The upper left transform coefficient of such a DCT block represents the average luminance of the corresponding pixel block and is commonly referred to as the DC coefficient. The other coefficients represent spatial frequencies and are referred to as AC coefficients. The upper left AC coefficients represent coarse details of the image, the lower right coefficients represent fine details.

The DVD recorder 3 re-marks the received MPEG bit stream in the DCT domain in a manner as described in Frank Hartung and Bernd Girod: "Digital Watermarking of MPEG-2 Coded Video in the Bitstream Domain", ICASSP Vol. 4, 1997, pp. 2621-2624. To this end, a partial decoding circuit 32 decodes the MPEG bit stream up to a level at which the DCT coefficients representing the image are available. The DCT coefficients at locations (u,v) in a DCT block are denoted X(u,v) in FIG. 1. They are applied to a watermark embedding stage 33. Side-information such as start codes, headers, motion vectors, etc. bypass this embedding circuit via a spath 321.

Figure 2B:
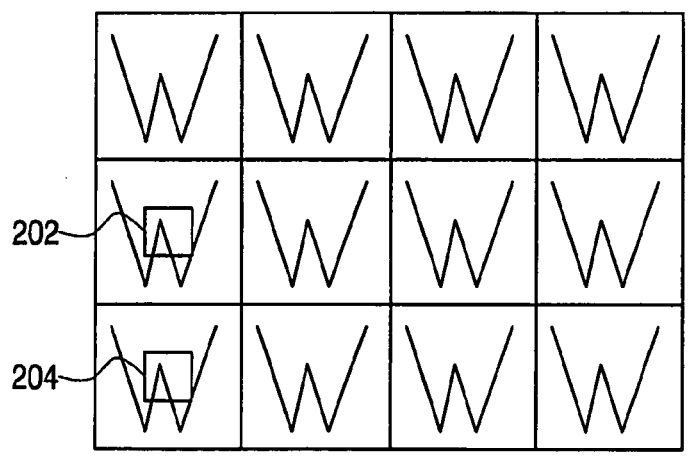

The watermark to be embedded is a pseudo-random noise sequence in the spatial domain. In this embodiment of the arrangement, a 128×128 basic watermark pattern is "tiled" over the extent of the image. This operation is illustrated in FIG. 2B. The 128×128 basic pseudo-random watermark pattern is herein represented by a symbol W for better visualization. The spatial pixel values of the basic watermark are transformed to the same representation as the video content in the MPEG stream. To this end, the 128×128 basic watermark pattern W is divided into 8×8 blocks, one of which is denoted 202 in FIG. 2B. The blocks are subjected to the discrete cosine transform and quantized. Note that the transform and quantizing operation need to be done only once. The DCT coefficients thus calculated are stored in a 128×128 watermark buffer 36. They are denoted W(u,v) in FIG. 1.

The watermark W is embedded by adding to each video DCT block the spatially corresponding watermark DCT block. The DCT block representing watermark block 202 in FIG. 2B is thus added to the DCT block representing image block 201 in FIG. 2A. However, the mere addition of a watermark block to a video block generally causes artifacts in the watermarked image. C. Podilchuk and W. Zeng: "Perceptual Watermarking of Still Images", IEEE Signal Processing Society 1997 Workshop on Multimedia Signal Processing, Princeton, N.J., USA, Jun. 23-25, 1997, pp. 363-368, have proposed a watermarking technique that is based on utilizing visual models to determine the maximum strength of watermark that each portion of an image can tolerate without affecting the visual quality of the image. They use a visual model developed by Watson (the "Watson model") to provide just noticeable differences (JND) that determine the location and maximum strength of the watermark signal that can be tolerated. The Watson model is described in Andrew B. Watson: "DCT Quantization Matrices Visually Optimized for Individual Images", SPIE Vol. 1913, 1992, pp. 202-216.

The consumer appliance 3 advantageously employs such a watermarking technique. In accordance with the teaching of Podilchuk and Zeng, the DVD recorder comprises a watermark embedding stage 33, which performs the following operation for each DCT block:

$$X'(u, v) = \begin{cases} X(u, v) + JND(u, v) \cdot W(u, v) & \text{if } X(u, v) > JND(u, v) \\ X(u, v) & \text{otherwise} \end{cases}$$

where JND(u,v) is the just noticeable difference calculated for each DCT block from the Watson model.

Figure 2C:
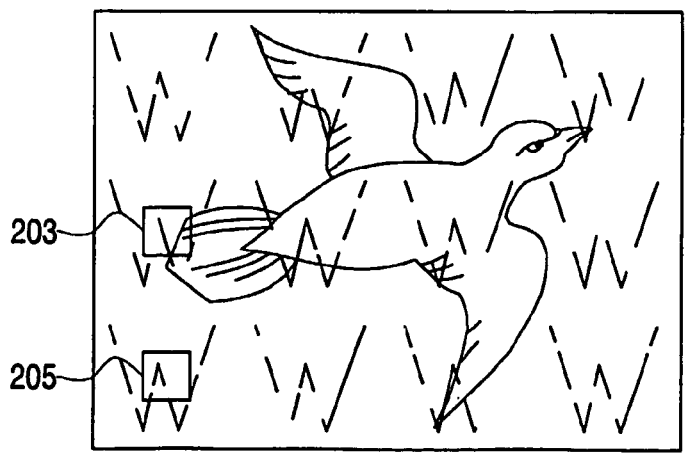

The modified DCT coefficients are subsequently re-encoded and merged with the side-information in a re-encoding circuit 34. The watermarked MPEG signal is finally recorded on optical disc 35. FIG. 2C shows the watermarked image. As has been attempted to express in this Figure, the amount of watermark embedding varies from block to block. More particularly, watermarked image block 203 spatially corresponding to watermarking block 202 has been embedded with a different embedding strength than image block 205 corresponding to the same watermarking block 204 at a different location of the image.

The calculation of the just noticeable differences JND(u,v) for each block of each image is generally a complicated operation, which cannot be carried out cost-effectively by consumer appliances 3. In accordance with the invention, the calculation is performed at the transmitting end, by an image analyzer 13. The calculated JND values are transmitted to the consumer appliance 3 along with the video signal. In FIG. 1, this is denoted by a multiplexer 14. Various schemes for transmission of the JND values along with the video signal are possible. One example is to use the facility of the MPEG2 standard to accommodate user data in an MPEG transport stream. This option requires synchronization data to be included in the user data so that the consumer appliance knows which JND value corresponds to which DCT coefficient. Another example is to embed the JND values as payload of a fragile watermark in the video signal. A simple but effective example of such a fragile watermark scheme is taught by UK Patent Application GB 2 063 018. It replaces the least significant bit or bits of selected signal samples by additional information bits. At the receiver end, the transmitted JND values are retrieved. This is denoted by a demultiplexer 31 in FIG. 1.

The consumer appliance 3 is preferably arranged to apply a given fixed embedding strength if no JND values are found in the bit stream. This embedding strength is chosen to be such that the embedded watermark will be perceptible. This operation will restrain the user from fraudulently processing the contents (e.g. attempting to remove the primary watermark) prior to recording.

The just noticeable difference value JND used in the above described embodiment is only one example of an embedding strength parameter. Another example is a visibility mask in the spatial domain as disclosed in International Patent Application WO 99/45705. Such a visibility mask provides a measure for the visibility of additive noise. For audio watermarking, audibility threshold values per sub-band of the frequency spectrum are a useful embedding strength parameter.

The invention can be summarized as follows. Advanced watermark embedders use psycho-visual/acoustic models to minimize perception of the embedded watermark in media contents. However, it is expensive to implement such advanced watermark embedders in consumer appliances (3) such as DVD recorders. In accordance with the invention, embedding strength parameters (JND) are calculated (13) off-line at a remote location (1) and transmitted along with the media contents to the consumer appliance (3). A relatively simple embedder (33) uses the received parameters to control the strength of the watermark (36) to be embedded. The parameters may be accommodated in the transmitted signal as payload of a fragile watermark or as user data in an encrypted MPEG stream.

The invention claimed is:

1. A NON-Transitory computer readable storage medium including a set of instructions stored thereon, which when executed by a digital processing system cause the digital processing system to perform a method of embedding a watermark in a media signal in the form of a bit stream, the method comprising:

receiving, at a local station, auxiliary data along with the media signal from a remote location;

retrieving an embedding strength parameter from the auxiliary data, said embedding strength parameter being computed at the remote location and being representative of an embedding strength with which the watermark is to be embedded in the media signal at the local station; and either embedding said watermark in the media signal at the local station with the embedding strength parameter as the embedding strength or embedding said watermark in the media signal at the local station with a fixed embedding strength as the embedding strength such that the watermark is perceptible in response to the embedding strength parameter not being found or being corrupt.

2. The NON-Transitory computer readable storage medium of claim 1, wherein said media signal is received as a compressed bit stream, the auxiliary signal-data being accommodated as user data in said bit stream.

3. The NON-Transitory computer readable storage medium of claim 1, wherein the auxiliary data is accommodated in the form of a fragile watermark in the media signal and the embedding strength parameter is payload of the fragile watermark.

4. An apparatus for embedding a watermark in a media signal, the apparatus comprising means for receiving, at a local station, auxiliary data along with the media signal from a remote location;

means for retrieving an embedding strength parameter from the auxiliary data, said embedding strength parameter being computed at the remote location and being representative of an embedding strength with which the watermark is to be embedded in the media signal at the local station; and means for embedding, said means arranged either for embedding said watermark in the media signal at the local station with the embedding strength parameter as the embedding strength or embedding said watermark in the media signal at the local station with a fixed embedding strength as the embedding strength such that the watermark is perceptible in response to the embedding strength parameter not being found or being corrupt.

5. A NON-Transitory computer readable storage medium including a set of instructions stored thereon, which when executed by a digital processing system cause the digital processing system to perform a method of transmitting a media signal from a remote location to a local station, the method comprising:

means for computing, at the remote location a embedding strength parameter, said embedding strength parameter representing a strength with which a watermark is to be embedded in the media signal by a local station, and means for transmitting said embedding strength parameter to the local station in the form of auxiliary data along with the media signal.

6. An apparatus for transmitting a media signal from a remote location to a local station, the apparatus comprising:

means for computing, at the remote location, an embedding strength parameter, said embedding strength parameter representing a strength with which a watermark is to be embedded in the media signal by local station; and means for transmitting said embedding strength parameter to the local station in the form of auxiliary data along with the media signal.

7. A method of embedding a watermark in a media signal, the method comprising:

receiving, at a local station, auxiliary data along with the media signal from a remote location;

retrieving an embedding strength parameter from the auxiliary data, said embedding strength parameter being computed at the remote location and being representative of an embedding strength with which the watermark is to be embedded in the media signal at the local station; and either embedding said watermark in the media signal at the local station with the embedding strength parameter as the embedding strength or embedding said watermark in the media signal at the local station with a fixed embedding strength as the embedding strength such that the watermark is perceptible in response to the embedding strength parameter not being found or being corrupt.

8. The method of claim 7, wherein said media signal is received as a compressed bit stream, the auxiliary data being accommodated as user data in said bit stream.

9. The method of claim 7, wherein the auxiliary data is accommodated in the form of a fragile watermark in the media signal, and the embedding strength parameter is a payload of the fragile watermark.

\* \* \* \* \*